(12) United States Patent
Wilson

(10) Patent No.: US 8,876,425 B2
(45) Date of Patent: Nov. 4, 2014

(54) UNION BETWEEN DISSIMILAR MATERIALS

(75) Inventor: Mark J. Wilson, Muscle Shoals, AL (US)

(73) Assignee: Shoals Tubular Products, Inc., Florence, AL (US)

( * ) Notice: Subject to any disclaimer, the term of this patent is extended or adjusted under 35 U.S.C. 154(b) by 0 days.

(21) Appl. No.: 13/547,869

(22) Filed: Jul. 12, 2012

(65) Prior Publication Data
US 2014/0016995 A1 Jan. 16, 2014

(51) Int. Cl.
*F16L 41/00* (2006.01)

(52) U.S. Cl.
USPC ........................................ 403/267; 285/286.2

(58) Field of Classification Search
USPC .................. 403/265–267, 271, 272, 202; 285/294.4, 294.3, 296.1, 382.2
See application file for complete search history.

(56) References Cited

U.S. PATENT DOCUMENTS

| | | | |
|---|---|---|---|
| 2,741,498 A | 4/1956 | Elliott | |
| 3,306,109 A * | 2/1967 | Caparone | 428/616 |
| 3,830,262 A | 8/1974 | Lago | |
| 3,892,032 A | 7/1975 | Bagnulo | |
| 4,415,187 A * | 11/1983 | Hudson, Jr. | 285/148.12 |
| 4,458,924 A | 7/1984 | Schlicht | |
| 4,693,501 A | 9/1987 | Logsdon, Jr. et al. | |
| 4,702,406 A | 10/1987 | Sullivan et al. | |
| 4,906,027 A | 3/1990 | De Gruijter | |
| 5,042,847 A | 8/1991 | Lasecki et al. | |
| 5,338,072 A | 8/1994 | Bitter et al. | |
| 5,498,096 A | 3/1996 | Johnson | |
| 5,613,794 A * | 3/1997 | Isaac et al. | 403/265 |
| 7,661,720 B2 | 2/2010 | Nakano et al. | |
| 2005/0263568 A1 | 12/2005 | Stol | |

OTHER PUBLICATIONS

International Search Report and Written Opinion mailed Nov. 29, 2013 in corresponding International Application No. PCT/US2013/050374 filed Jul. 12, 2013.

* cited by examiner

*Primary Examiner* — Michael P Ferguson
*Assistant Examiner* — Daniel Wiley
(74) *Attorney, Agent, or Firm* — Angela Holt; Bradley Arant Boult Cummings LLP

(57) ABSTRACT

A sleeve is placed between a first body and second body, where the first body and the second body are different materials. The sleeve is a third material that is at least similar to the material of the first body, and a mechanical connection is made between the sleeve and the second body. The mechanical connection has a locking abutment where the surface of the sleeve is angled toward the end of the second body that is in the union, and this angled surface of the sleeve abuts the second body. A first connection substance is positioned between the sleeve and the first body, and a second connection substance is positioned between the sleeve and the second body.

16 Claims, 12 Drawing Sheets

UNION BETWEEN DISSIMILAR MATERIALS

BACKGROUND OF THE INVENTION a. Field of the Invention

This invention relates to unions or connections between objects made from different materials.

b. Background of the Invention

There are many reasons to connect dissimilar materials. Every material has its own set of characteristics, and the characteristics often have certain advantages and disadvantages for a particular service. For example, polymers are typically light weight and flexible, but many metals are very strong and ridged. Often times a component will have different requirements at different locations, so the parameters for selecting a material will vary from one location to another. Many times, a designer will want a strong, secure connection between two dissimilar materials. This can facilitate a change of materials for different locations while maintaining the integrity of a component or part.

For example, a pipe may use one material that resists corrosion in a corrosive area, and the same pipe may use a lower cost material in less corrosive areas. There should be a strong union between the two different materials so the contents of the pipe don't leak or spill. An antenna or rod may use a very strong material at a stress point, and a light weight material for areas where the antenna extends upward to minimize weight, and a union between the strong and light weight material is necessary to support the upward extension. An electrical line may use a flexible, highly conductive material in a location where the line passes through a conduit, and a lower cost material could be used to cover long distances where the line is suspended from poles. A good connection between the two materials is necessary for electrical conduction. There are many other examples where a strong, durable union between dissimilar materials is desirable.

Many techniques can be used for joining dissimilar materials. Perhaps the most obvious is a mechanical connection, such as using threads to screw two pieces together, or the use of nails or rivets to hold parts together. A friction fit, also referred to as an interference fit, involves placing parts tightly together such that friction holds them in place. Factors that affect a friction fit include the union surface area, the number of surfaces involved, surface materials and surface texture. There are many other types of mechanical connections, and as with different materials, different types of connections have various characteristics with advantages and disadvantages for specific applications. Some mechanical connections can work loose, and many mechanical connections will not form an air-tight seal.

Another type of connection uses a binder of some sort. A welded joint involves actual melting and mixing of the components, and a filler material is often used. A welded joint is typically very strong and airtight. Welding may require high localized heat that can distort parts, it often requires skill to apply, and the union may require additional clean-up work. Polymeric parts can be welded together without a filler material, but polymeric welding is primarily used with thermoplastic polymers as opposed to thermoset polymers. A solvent can be used with PVC parts to partially dissolve and effectively "melt" different pieces together.

Brazing or soldering melts a filler material but not the component parts. Brazing is very similar to soldering, except higher temperatures are used. The component parts are placed close together with small tolerances, and the filler material is melted and flows by capillary action between the parts. The union is then cooled so the filler material solidifies and holds the parts together. Brazing and soldering make a strong connection that is airtight, and the union is typically clean so little or no additional work is required after formation. Alternatively, different components parts can be placed together with an adhesive between them, and the adhesive attaches to each part. Many adhesives do not require any heating, but the components often need to be held together without disturbance for a period of time to allow the adhesive to "set". Adhesives can make air-tight unions, but the connection is typically not as strong as a brazed or soldered part.

It can be more difficult to form a strong, durable union between dissimilar materials than between similar materials. For example, many dissimilar metals melt at different temperatures, as well as having different thermal conductivities and coefficients of thermal expansion, so many dissimilar metals are difficult to weld together. Many dissimilar materials can be brazed together, but the connection is often weaker than when brazing similar materials. A brazing compound can be selected that is very effective for one material, but the same brazing compound may not be as effective for the other material. Therefore, a brazed connection between two dissimilar materials may not be as strong as a brazed connection between similar materials. The same principle applies to soldering, and may apply to adhesives as well.

One potential disadvantage of connecting dissimilar materials is galvanic corrosion, especially when working with metals. Galvanic corrosion is well documented for metals, and can include materials such as graphite. Galvanic corrosion is sometimes referred to as electrolysis or dissimilar metal corrosion. When two different metals that are in electrical contact are placed in a common electrolyte, a current is produced that can cause one metal to discharge ions into the electrolyte. This reduces the amount of metal at the union, and serves to accelerate corrosion. Distilled water is not an electrolyte, but water readily absorbs or dissolves small amounts of various compounds, and this makes the water an electrolyte. Most water found in nature has dissolved compounds and is an electrolyte, and water is the most common electrolyte involved with galvanic corrosion (but other electrolytes are possible). Water found in coastal areas or around salt water can contain higher concentrations of compounds, and makes a very strong electrolyte that can accelerate corrosion.

Galvanic corrosion is more rapid when the difference in the electrical potential of the metals involved is large. The higher the difference in electrical potential (also referred to as galvanic potential or electrode potential), the more rapid the corrosion. The less noble metal discharges ions into the electrolyte in galvanic corrosion, so the less noble metal degrades more rapidly than the more noble metal. The higher the electrical potential, the more noble the metal. The more noble metal will act as a cathode, the less noble metal will act as an anode, and the dissimilar metals will effectively form a battery that drives the galvanic corrosion. Some techniques that can be used to combat galvanic corrosion include (i) use metals with a small difference in electrical potential, (ii) prevent simultaneous contact of the two metals with an electrolyte, and (iii) electrically isolate the two metals, such as by physically separating them or placing an insulator between them.

A sacrificial anode can be used to help combat galvanic corrosion. A sacrificial anode will typically be placed in electrical contact with the part to be protected, and immersed or exposed to the same electrolyte. The sacrificial anode should have a lower electrical potential than the part being protected, so the sacrificial anode is less noble. The sacrificial anode will discharge ions more rapidly than the more noble part being protected, so the more noble part will not erode until the sacrificial anode either decomposes, or no longer contacts the electrolyte, or loses its electrical connection with the item being protected. Other factors can also be involved, such as distance and surface area.

SUMMARY OF THE INVENTION

A sleeve is placed between a first body and second body, where the first body and the second body are different materials. The sleeve is a third material that is at least similar to the material of the first body, and a mechanical connection is made between the sleeve and the second body. The mechanical connection has a locking abutment where the surface of the sleeve is angled toward the end of the second body that is in the union, and this angled surface of the sleeve abuts the second body. A first connection substance is positioned between the sleeve and the first body, and a second connection substance is positioned between the sleeve and the second body.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. In particular, the tolerances between the bodies and the sleeve have been exaggerated to better show the concepts involved. Furthermore, like reference numerals designate corresponding parts throughout the figures.

DETAILED DESCRIPTION

First and Second Body

Figure 1:
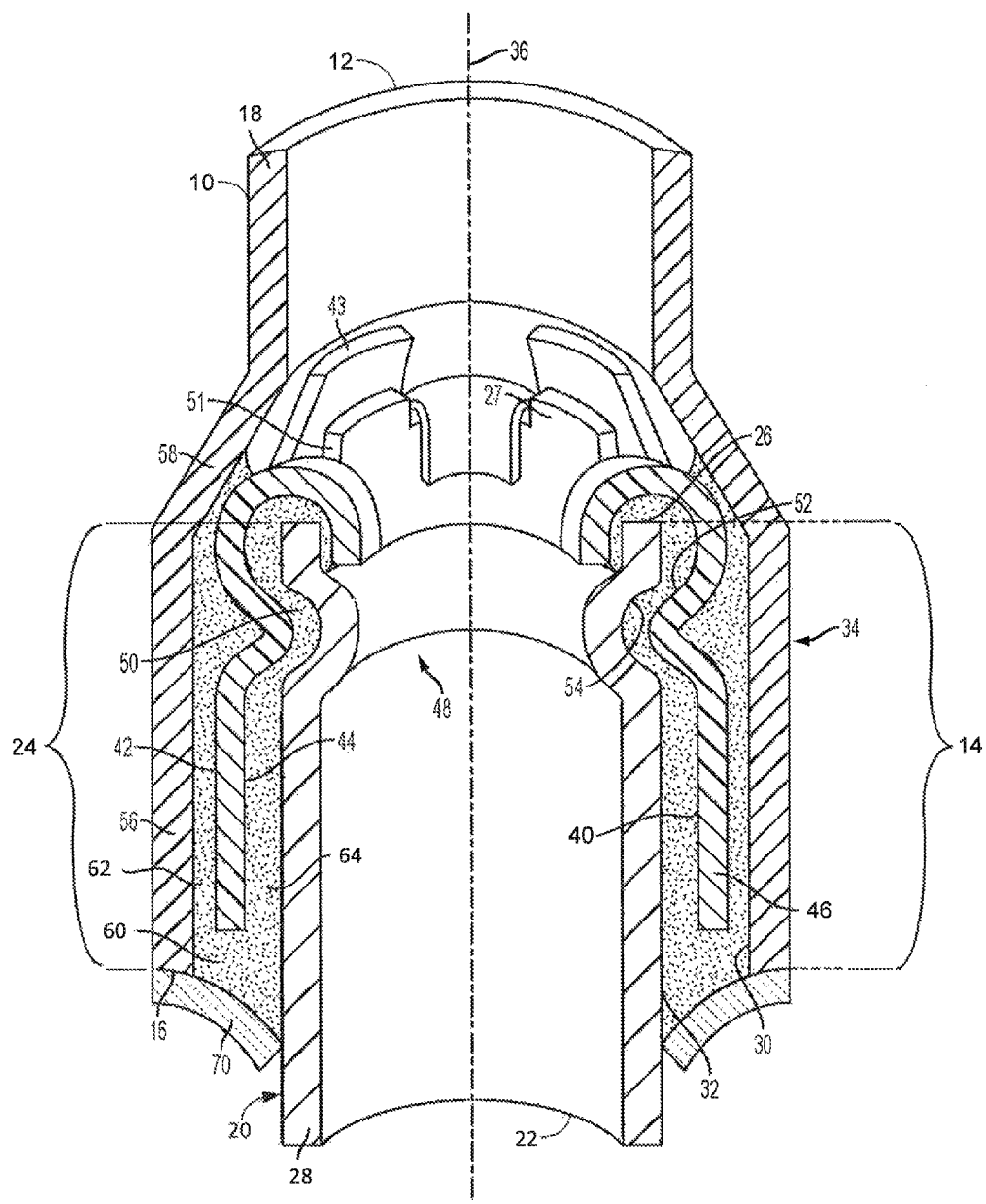
FIG. 1 is a perspective sectional view of one embodiment of two dissimilar tubes connected together.

There are several ways to connect two or more objects made from dissimilar materials. This description will emphasis a connection between two objects, but those skilled in the art will realize the concepts described could be expanded to cover three or more objects. The first object is referred to as the first body 10, and this description will primarily describe a first body 10 that is a first tube 12, as seen in FIG. 1. It should be understood that the first body 10 could also be a block, a solid cylinder such as a wire, a thin sheet, or a wide variety of other shapes, with a couple of examples shown in the FIGS. 2 and 7, with continuing reference to FIG. 1. However, for simplicity and clarity, this description will primarily describe a connection where tubes or pipes are the objects being connected, with the understanding that the principles and description also apply to other shapes. The first tube 12 has a first overlap area 14, where the first overlap area 14 terminates in the first end 16. The first tube 12 is made from a first material 18.

The first tube 12 is connected to a second body 20, where the second body 20 is generally described as a second tube 22. The second body 20 could also be a block, cylinder, or other shape, and the second body 20 does not have to be the same shape or type of object as the first body 10. As with the first body 10, this description will primarily describe the second body 20 as the second tube 22, with the understanding that other types of objects or shapes could be substituted for the first and second tubes 12, 22, as desired. The second tube 22 also has a second overlap area 24 that terminates in a second end 26, and is made from a second material 28. The second material 28 is different than the first material 18, and the first and second materials 18, 28 are different enough to be dissimilar. Dissimilar materials generally means materials that do not easily form strong bonds together. In one example embodiment for metals, dissimilar means the metals are primarily made of different elements. In an example embodiment for polymers, dissimilar means thermoset as compared to thermoplastic. In other example embodiments, dissimilar means different types of materials, such as mixed combinations of (i) metal, (ii) ceramic, (iii) polymer, (iv) wood, (v) fabric, (vi) rock or mineral, and (vii) graphite.

The first overlap area 14 and the second overlap area 24 are overlapped at the connection, and the first and second ends 16, 26 are at the end of the first and second overlap area 14, 24 such that the first and second ends 16, 26 are in the region where the first and second tube 12, 22 are connected. Therefore, the first tube 12 begins at the first end 16, and then proceeds to the first overlap area 14, and then proceeds to the body of the first tube 12 if there is any body past the first overlap area 14. Similarly, the second tube 22 begins at the second end 26, and then proceeds to the second overlap area 24, and then proceeds to the body of the second tube 22 if there is any body past the second overlap area 24. The first and second overlap areas 14, 24 are defined by the area where the first and second tube 12, 22 actually overlap, so any part of the first and second tube 12, 22 beyond the area where the two tubes 12, 22 overlap is not a part of the first and second overlap areas 14, 24.

The first and second tubes 12, 22 overlap at the first and second overlap area 14, 24, but either tube 12, 22 could be on the outside. In various embodiments, the first tube 12 is over, outside of, or above the second tube 22, and in various other embodiments the second tube 22 is over, outside of, or above the first tube 12. The first and second overlap areas 14, 24 are sized and shaped to fit closely together. There is a first overlap surface 30 that is either the inner or outer surface of the first tube 12, and there is a second overlap surface 32 that is either the inner or outer surface of the second tube 22. The first and second overlap surfaces 30, 32 face each other in the connection or union 34, so one of the first and second overlap surfaces 30, 32 is an inner surface, and the other of the first and second overlap surfaces 30, 32 is an outer surface. The first and second overlap surfaces 30, 32 generally have complimentary shapes, because these surfaces face each other. However, in some embodiments, the first and second overlap surfaces 30, 32 have different shapes to facilitate the union 34. There can also be a union central axis 36, which is a line that extends along the length of the mid-point of the union 34.

Sleeve

A sleeve 40 is positioned between the first and second overlap area 14, 24 within the union 34. The sleeve 40 has a first sleeve surface 42 that faces and abuts the first overlap surface 30, and a second sleeve surface 44 that faces and abuts the second overlap surface 32. The sleeve is sized and shaped to fit between the first and second overlap area 14, 24. The first sleeve surface 42 is on the opposite side of the sleeve 40 as the second sleeve surface 44. The sleeve 40 can extend past the union 34, so the sleeve may 40 face and abut one of the first and second tubes 12, 22 at a point outside of the first and second tube overlap areas 14, 24. Preferably, the sleeve 40 extends over most or all of the union length 38, where the union length 38 is the distance between the first end 16 and the second end 26. The sleeve 40 may extend over the entire union width, where the union width is perpendicular to the union length 38. However, the sleeve 40 may extend for only a portion of the union width such that some portion(s) of the first and second overlap areas 14, 24 face each other in the union without the sleeve 40 between them. In some embodiments, the sleeve 40 can be two or more sleeves 40 which can be adjacent to each other or even positioned in multiple layers in the union 34. The sleeve 40 can have a constant thickness, but the sleeve 40 can also have varying thicknesses at different locations.

In many embodiments, the sleeve 40 is sized and shaped to fit between the first and second overlap areas 14, 24 with a small tolerance. In some embodiments, a small tolerance is less than 1 millimeter (mm), and preferably less than 0.2 mm, and more preferably less than 0.1 mm. In other embodiments, a small tolerance is a tolerance that enables acceptable capillary action for drawing liquid material into the spaces between the sleeve 40 and the first and second overlap area 14, 24. In some embodiments the liquid material drawn into place by capillary action is brazing material, or solder.

The sleeve 40 is a third material 46, where the third material is at least compatible with the first material 18. The third material 46 is similar to the first material 18 to facilitate a connection between the first and third materials 18, 46. In some embodiments, the third material 46 is the same as the first material 18, but in other embodiments there can be differences between the first and third materials 18, 46. For example, the first and third materials 18, 46 can be different metallic alloys, where the different metallic alloys are both primarily the same metal. For example, stainless steel and carbon steel are both primarily iron (Fe), 3003, 4047, 6061 and 7075 aluminum are both primarily aluminum (Al), and brass, bronze, and copper are primarily copper (Cu). In some embodiments, the first and third materials 18, 46 are considered similar if they are both made of primarily (more than 50%) the same metallic element, but in other embodiments the first and third materials 18, 46 are considered similar if they are both made from at least 70% the same metallic element, and in yet other embodiments the first and third materials 18, 46 are considered similar if they are both made from at least 95% the same metallic element. In this description, the percentage of a material present is based on mass ratios, as opposed to molar, volumetric, or other ratios. In different embodiments, the first and third materials 18, 46 are considered similar if they are both thermoplastic polymers.

There are many possible combinations of first, second, and third materials 18, 28, 46. For example, the first and third materials 18, 46 can be aluminum, and the second material 28 can be copper. The first and third materials 18, 46 can be steel, and the second material 28 can be brass. The first and third materials 18, 46 can be a thermoplastic polyethylene, and the second material 28 can be a thermoset polyimide. The first and third materials 18, 46 can be ceramic, and the second material 28 can be cast iron. There can be different alloys or variations, so the first material 18 may be one alloy of aluminum, the third material 46 can be a different alloy of aluminum, and the second material 28 can be an aluminum alloy of bronze.

There should not be a high degree of galvanic corrosion between the sleeve 40 and the first tube 12 because they are made of similar or compatible materials. In some embodiments, the sleeve 40 and first tube 12 may be in electrical contact, and they may be exposed to the same electrolyte. In some embodiments, the sleeve 40 and first tube 12 are both metallic. Therefore, when galvanic corrosion is a concern, the third material 46 and the first material 18 should have a similar degree of nobility. This means the electrode potential of the first and third material 18, 46 should be small. A small difference in electrode potential means a difference of less than 0.7 volts, or preferably a difference of less than 0.3 volts, or more preferably a difference of less than 0.1 volts. In many embodiments, but not all embodiments, the connection substance 60 is also similar to the first and/or third materials 18, 46.

The first and third materials 18, 46 are similar to facilitate a good connection. This can mean the first and third materials 18, 46 are selected such that one adhesive will strongly attach to each, or one brazing material or soldering material will strongly attach to each. The first and third materials 18, 46 may be similar so that they will melt together, either by metallic welding, polymeric welding, solvent "melting" and blending, or other similar joining techniques.

Mechanical Connection

There is a mechanical connection 48 between the sleeve 40 and the second tube 22. In some embodiments, this mechanical connection 48 comprises a locking abutment 50, such that the mechanical connection 48 is more than just a friction or interference fit. The locking abutment 50 can comprise a portion of the second sleeve surface 44 that abuts the second overlap surface 32, where the second sleeve surface 44 in the locking abutment 50 faces toward the second end 26. The portion of the sleeve surface 44 that faces toward the second end 26 can be referred to as the ramp 52. In other embodiments, the sleeve end surface 43 facing towards the second end 26 can be the ramp 52, where the sleeve end surface 43 is the end of the sleeve 40 along the width of the sleeve 40. In some embodiments, the sleeve end surface 43 abuts a portion of the second overlap surface 32 to mechanically hold the sleeve 40 in position relative to the second tube 22. In a similar manner, the second overlap surface 32 in the locking abutment 50 faces toward the first end 16, and the portion of the second overlap surface 32 that faces toward the first end 16 can be referred to as the incline 54. This mechanical connection 48 locks the sleeve 40 in position in the union 34 relative to the second tube 22. The second tube 22 cannot slide out of the union 34 over the sleeve 40, because a force that urges the second tube 22 over the sleeve 40 and out of the union 34 just urges the ramp 52 into the incline 54 in the locking abutment

50. The ramp 52 and incline 54 of the locking abutment 50 therefore mechanically holds the second tube 22 in place relative to the sleeve 40.

The second sleeve surface 44 in the ramp 52 may or may not face directly towards the second end 26, but does face in the direction of the second end 26. That means the ramp 52 faces more towards the second end 26 than the first end 16 in the locking abutment 50. The second sleeve surface 44 is angled relative to the union central axis 36 in the ramp 52 at the locking abutment 50 such that the ramp 52 of the second sleeve surface 44 faces more towards the second end 26 than the first end 16. Straight tubes that overlap about a sleeve 40 would produce surfaces that were perpendicular to the union central axis 36, so the locking abutment 50 means the mechanical union is more than just sliding one tube over another.

There are many different ways to form the locking abutment 50. The locking abutment 50 can be formed by simple assembly of the various components, but there may be a bending or deformation step as well. A connector 72 may be used, and there can be intermediate cases where components cause deformation by assembly, like teeth that bite into another material.

Figure 2:
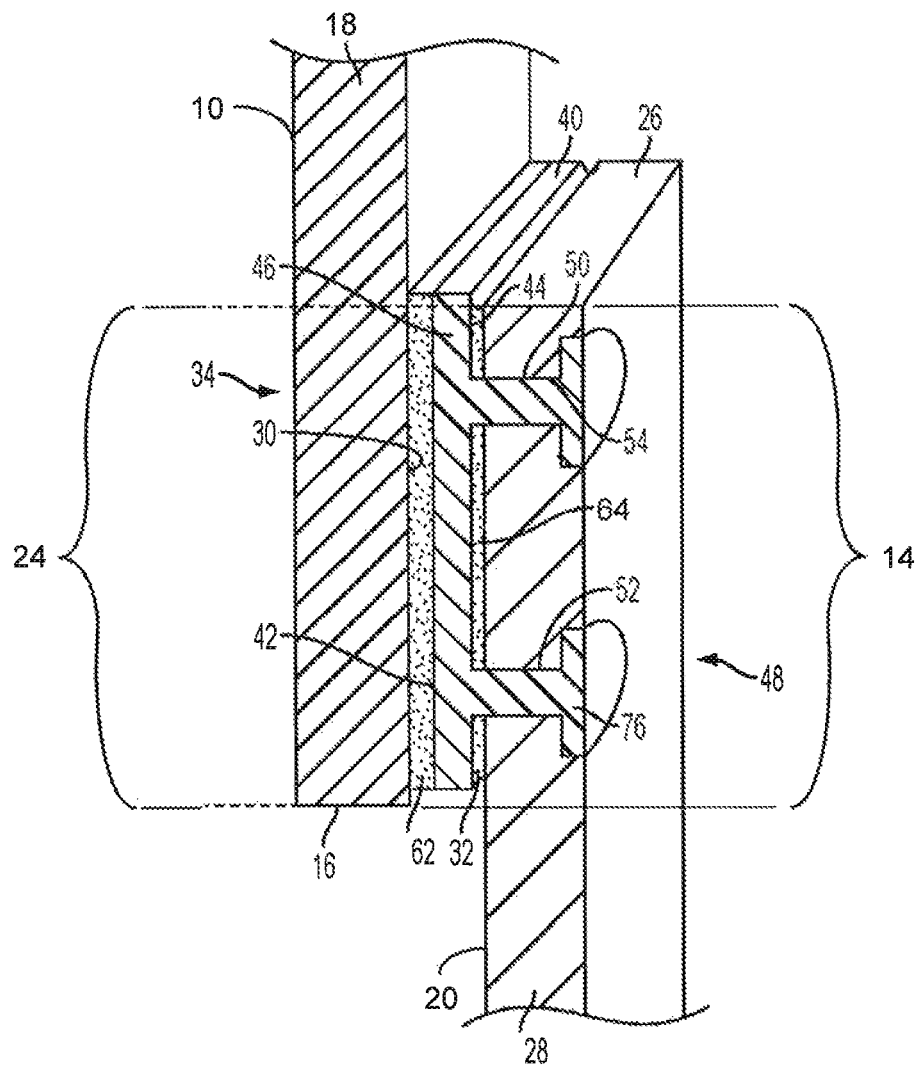
FIG. 2 is a perspective sectional view of an embodiment of two dissimilar blocks connected together.

The locking abutment 50 may comprise a pin 76 or plug that is part of sleeve 40, where the pin 76 extends essentially through the second overlap area 24, so a portion of the pin 76 would face towards the second end 26, and would be the ramp 52 as seen in FIG. 2. Alternatively, the pin 76 could be part of the second tube 22 and extend through the sleeve 40, and there would still be a ramp 52 of the second sleeve surface 44 facing towards the second end 26. In alternate embodiments, the sleeve 40 and second overlap area 24 are bent after being assembled so that a portion of the second sleeve surface 44 faces towards the second end 26, as seen in FIG. 1. This bent portion then comprises the ramp 52 in the locking abutment 50, and the bend can be either inward toward the center of the tube or outward, as desired. The first overlap area 14 (which is part of the first tube 12) may or may not be bent to form a mechanical connection 48 with the sleeve 40. The first and second materials 18, 28 may have different thicknesses and/or malleability, and this may be a consideration in determining which components should be deformed or bent to form the locking abutment 50.

Figure 8:
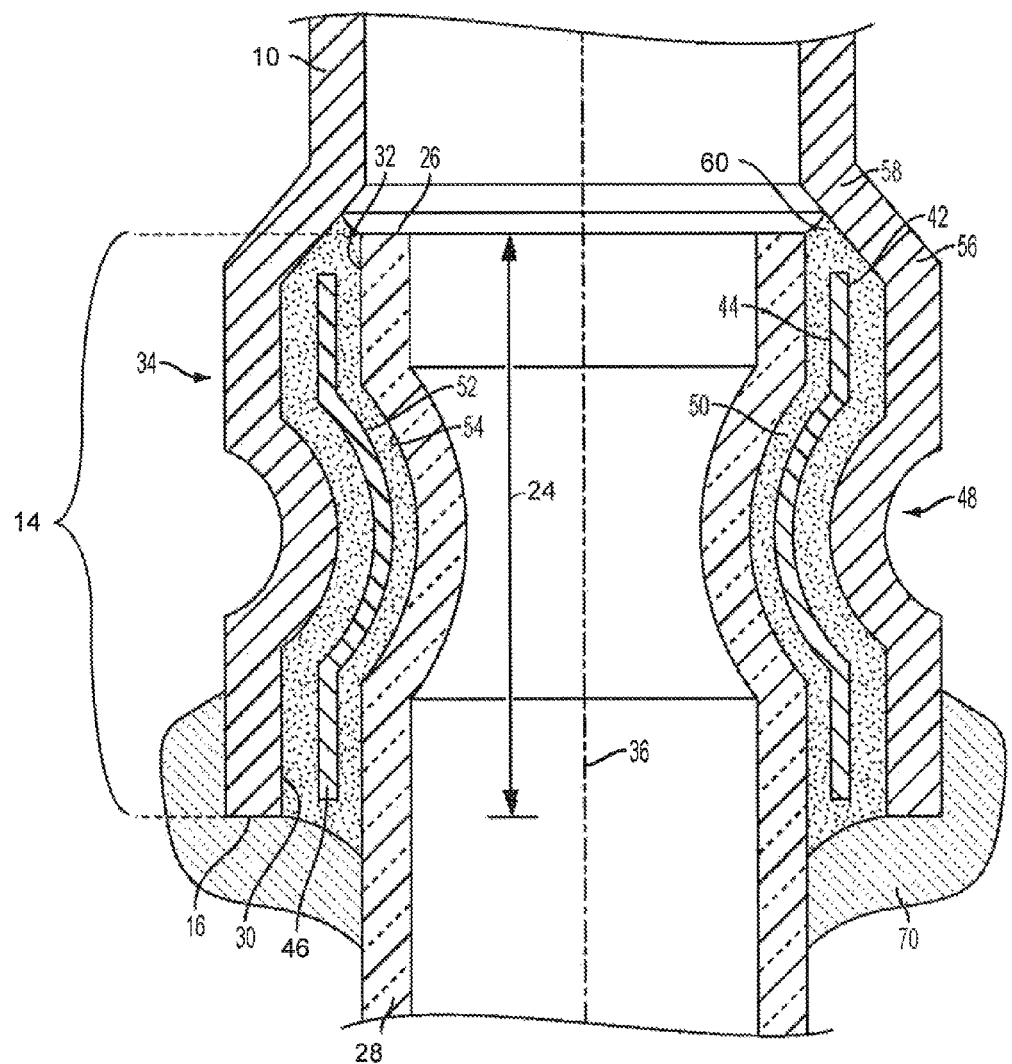
FIG. 8 is a sectional side view of another embodiment of two dissimilar tubes connected together.
Figure 9:
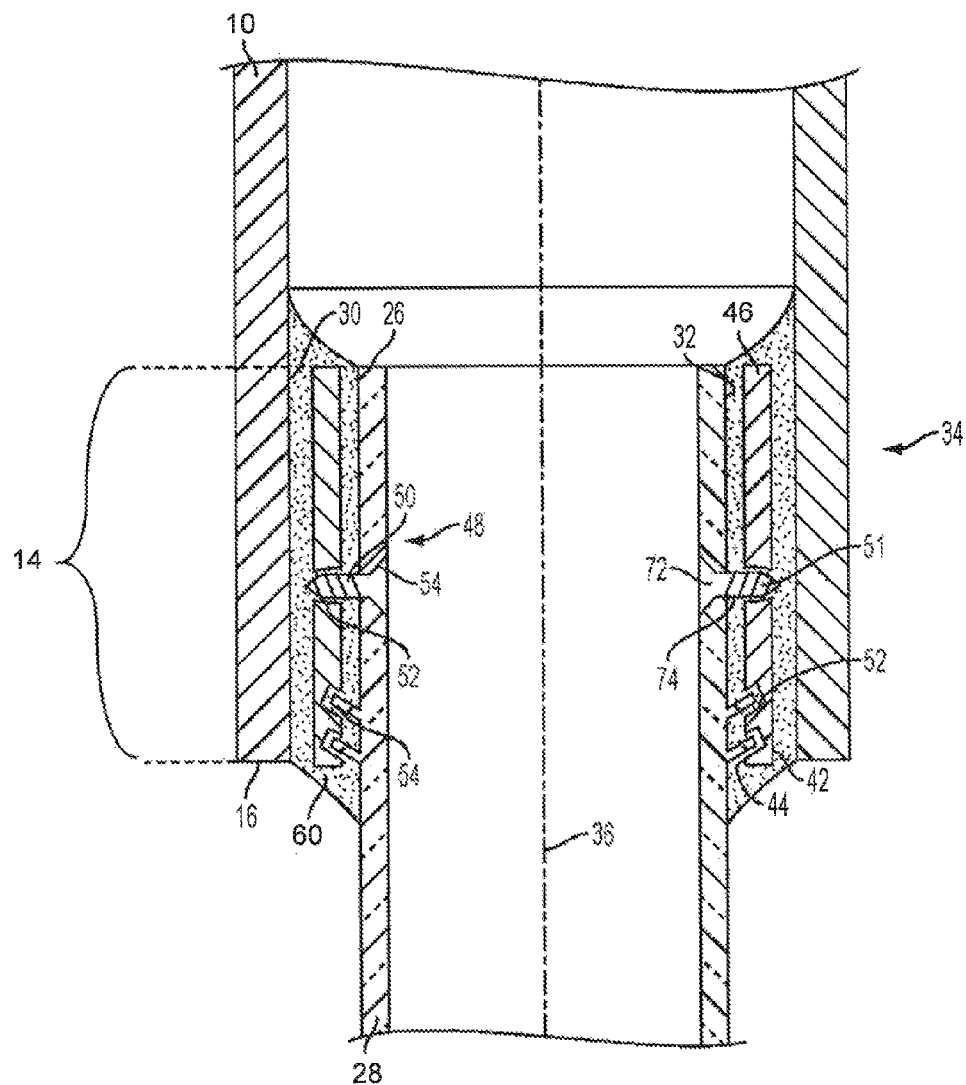
FIG. 9 is a sectional side view of a different embodiment of two dissimilar tubes connected together.

A mechanical connection 48 can be made by deforming or bending the sleeve 40 and second overlap area 24 together, as shown in FIG. 1. In some embodiments. The first overlap area 14 can be bent with sleeve 40 and second overlap area 24, as shown in FIG. 8. There are several factors that can be considered to determine whether to bend the first overlap area 14 with the second overlap area 24, including how thick or brittle the first material 18 is, how strong the mechanical connection 48 will be when the first overlap area 14 is part of it, bending equipment costs, and utility of the union design with an indent in the first overlap area 14. Alternatively, the sleeve 40 and the second overlap area 24 can have matching threads so the sleeve 40 and second overlap area 24 are twisted together like a nut and bolt, as seen in FIG. 9. In this embodiment, surfaces of the threads serve as the ramp 52 and incline 54.

Figure 3:
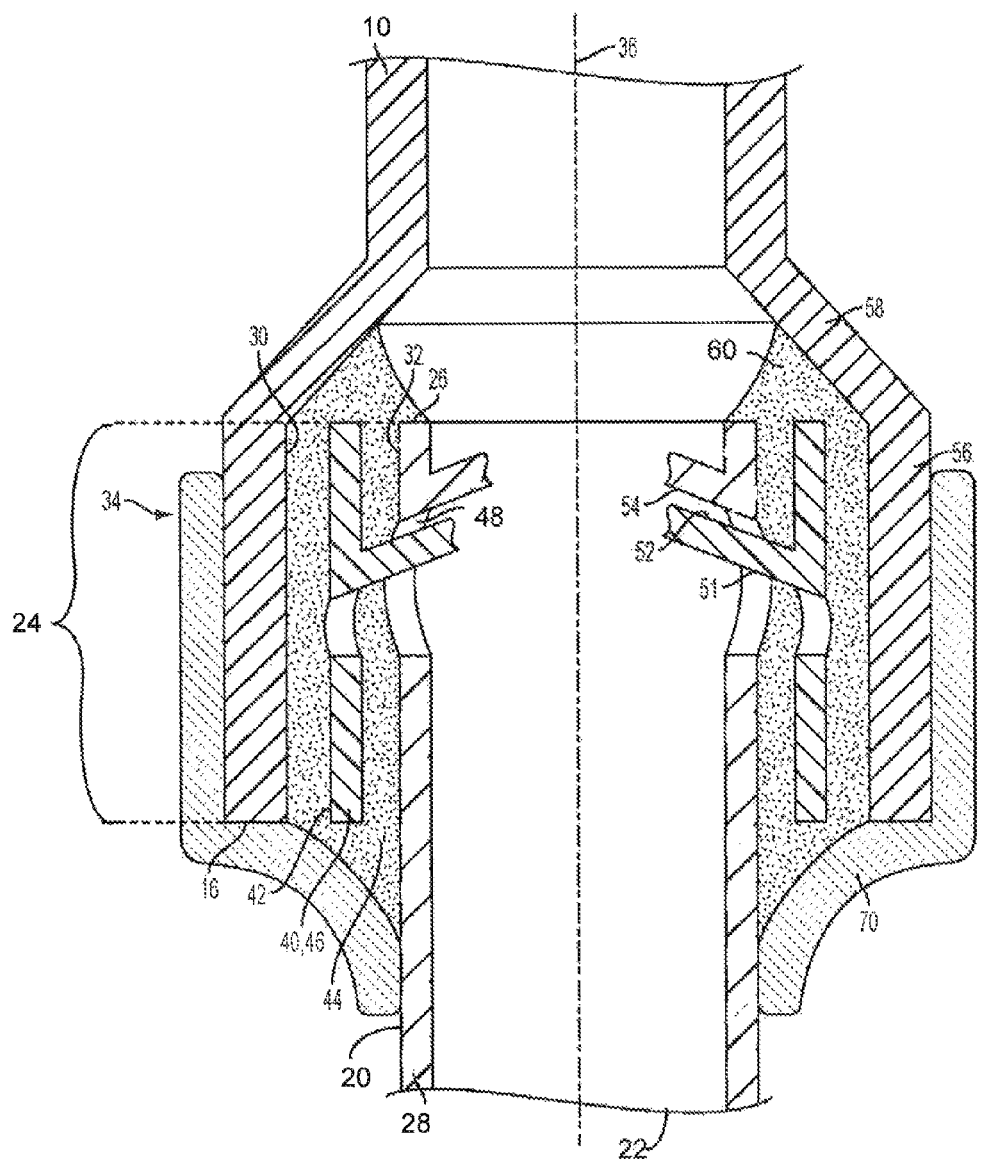
FIG. 3 is a sectional side view of another embodiment of two dissimilar tubes connected together.
Figure 4:
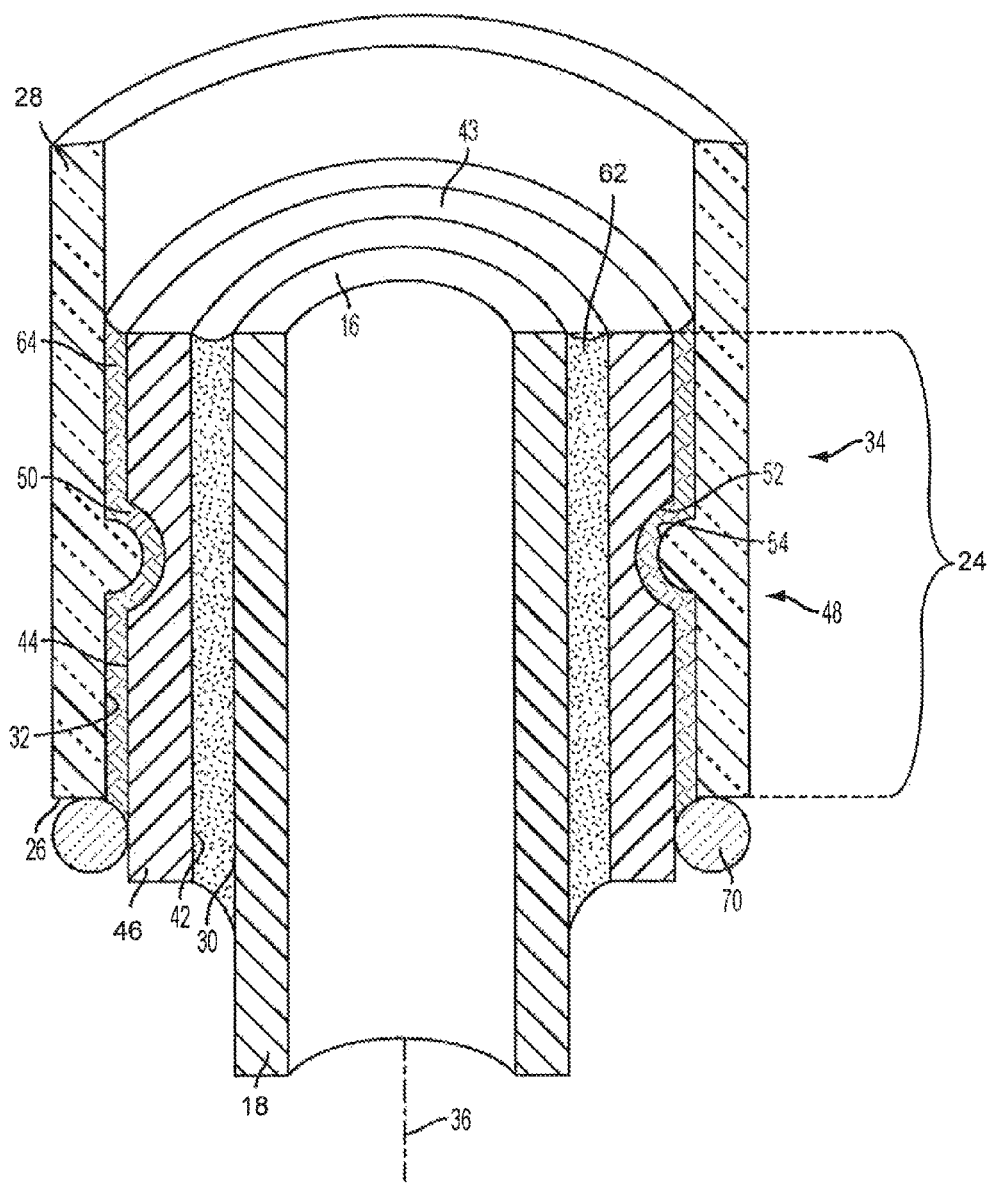
FIG. 4 is a perspective sectional view of yet another embodiment of two dissimilar tubes connected together.
Figure 5:
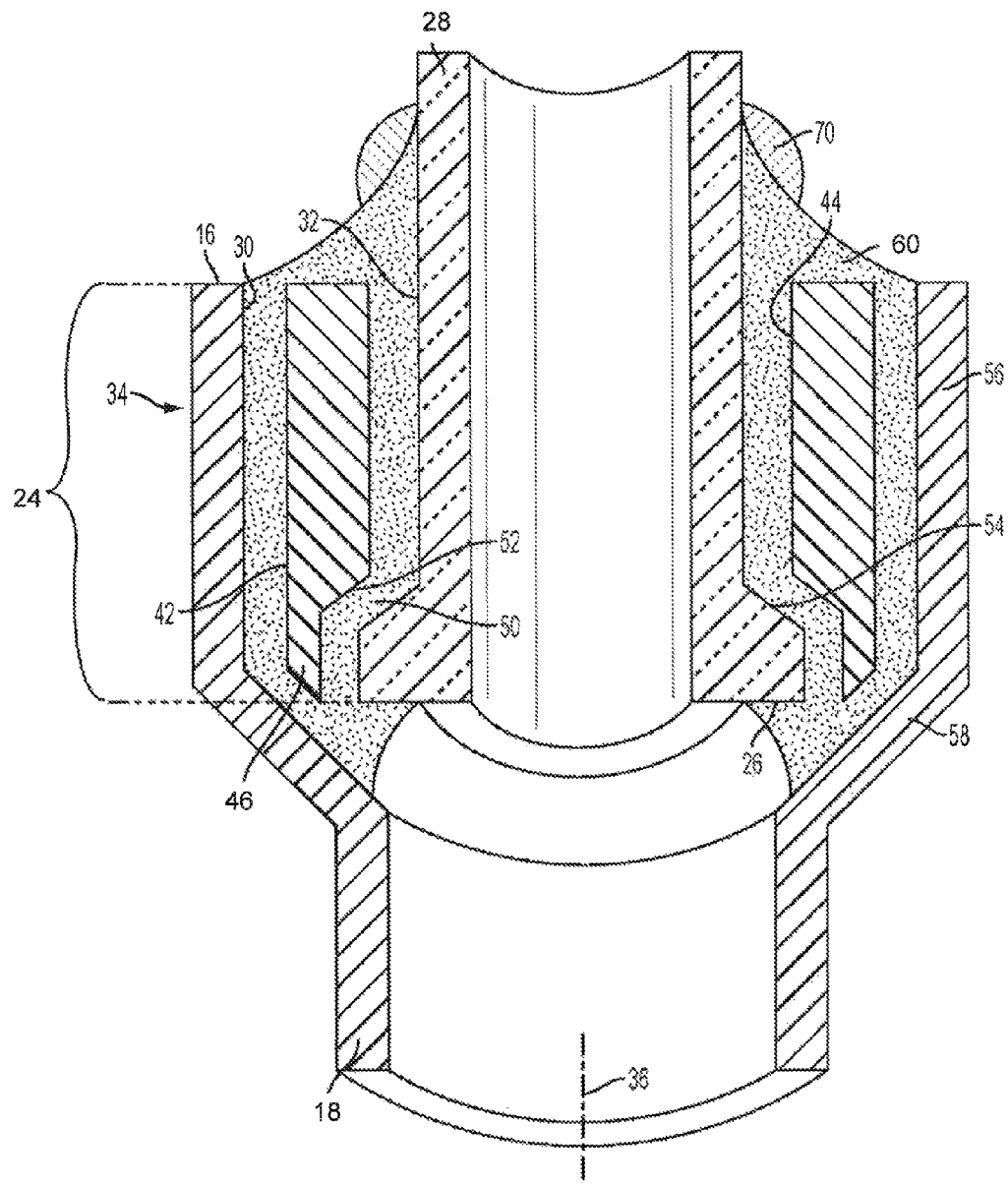
FIG. 5 is a perspective sectional view of still another embodiment of two dissimilar tubes connected together.

There are many other methods to form the locking abutment 50. In another embodiment shown in FIG. 3, the sleeve 40 and second overlap area 24 can be punctured and bent back such that the bent back portion of the second sleeve surface 44 forms the ramp 52 and faces towards the second end 26. In still another embodiment, there can be an aligned ridge and indent in the sleeve 40 and second overlap area 24, as seen in FIG. 4. Alternately, as shown in FIG. 5, the sleeve 40 can be supplied with a pre-formed ramp 52, and the second overlap area 26 can be supplied with a pre-formed incline 54 such that the ramp 52 and incline 54 abut and form the locking abutment 50. The ramp 52 shown in FIG. 5 could be the sleeve end surface 43, or the surface between the first and second sleeve surface 42, 44 that faces towards the second end 26. The sleeve 40 may not have a constant thickness, and the second overlap area 26 also may not have a constant thickness, but the ramp 52 and/or incline 54 could be formed by bending a component that does have a constant thickness. There are many other possible techniques or designs for a locking abutment 50, such as but not limited to tooth-like connections that slide one way and then "bite" into place, or racket type connections that "click" into place. The locking abutment 50 can extend around the entire width of the union 34, or it can be intermittent. There can be a single locking abutment 50, or there can be more than one, including examples where the locking abutment extends around the entire width of the union 34 such that there are locking abutments 50 at different locations along the union length 38.

Rivets or other connectors 72 can be combined with this technique, or used separately, if desired, as seen in FIG. 9. In fact, in some embodiments, the mechanical connection 48 can be formed by rivets, nails, screws, or some other type of connector 72. The rivet or other type of connector 72 can penetrate the sleeve 40 and the second tube 22, and the connector 72 can be secured in place with threads, or an expanded area such as a screw head, a rivet head and a rivet expansion or bucktail. The connector side surface 74 abuts (i) the surface of the sleeve 40 at the penetration point and (ii) the surface of the second tube 22 at the penetration point. In this embodiment, the connector side surface 74 faces towards the second end 26, and the connector 72 serves to lock the sleeve 40 and the second tube 22 together in a mechanical connection 48.

A pin 76, rivet, screw, connector 72 of any type, or simple puncture and bending of the sleeve 40 and second tube 22 does make a puncture or hole. The puncture of the sleeve 40 and/or second overlap area 24 should not cause leaks as long as the puncture is aligned with the first overlap area 14. A weakened sleeve 40 and/or second overlap area 24 can be reinforced by the first overlap are 14 to help maintain integrity. A filler or connection substance can also help plug and seal the hole. The locking abutment 50 can be positioned within the union 34, but it is also possible for the sleeve 40 to extend beyond the union 34 so the locking abutment 50 can be positioned outside of the union 34. When the locking abutment 50 is positioned outside of the union 34 there may not be any secondary layer for added strength or to prevent leaks, and this may limit the type of mechanical connection 48 selected.

The first or second tube 12, 22 can include an expanded end 56, where the other tube will fit within the expanded end 56. This can facilitate unions 34 where the internal diameter does not change, or only has small changes. The expanded end 56 will have a contracting portion 58 where the diameter becomes smaller as the expanded end 56 merges into the body of the first or second tube 12, 22. This contracting portion 58 can be used to help form the union 34. For example, if the first tube 12 is the outer tube having an expanded end 56, the sleeve 40 and the second overlap area 24 can both abut the contracting portion 58 so that the relative position of the sleeve 40 and the second tube 22 is fixed and held in place. The contracting portion 58 may be tapered, flat, or other shapes, but a tapered shape may help guide and position the other components during assembly.

The first and second tube 12, 22 may be shaped and positioned in the union 34 such that the first and second tube 12, 22 (or first and second body 10, 20 for other shapes) have to slide past each other to separate. This sliding union 34 limits how the first and second tube 12, 22 can come apart, and this can strengthen the union 34. One method to form a sliding union 34 is to have the first overlap area 14 that is tubular, or an annular shape, and slide this first overlap area 14 into a slightly larger tubular or annular shaped second overlap area 24. The relative size and positions of the first and second overlap areas 14, 24 can also be reversed. The first and second overlap areas 14, 24 cannot move perpendicularly away from each other, so they must be slide over each other to separate. A similar sliding union 34 can be made with a tube sliding over a bar, and the tube and bar can be round, square, or a wide variety of shapes. Other shapes are also possible, such as where the outer body does not completely cover the inner body. A sleeve 40 can be positioned between the first and second tube 12, 22 in this sliding union 34, and the sliding union 34 can in fact help secure the sleeve 40 in place between the first and second tube 12, 22.

Figure 6:
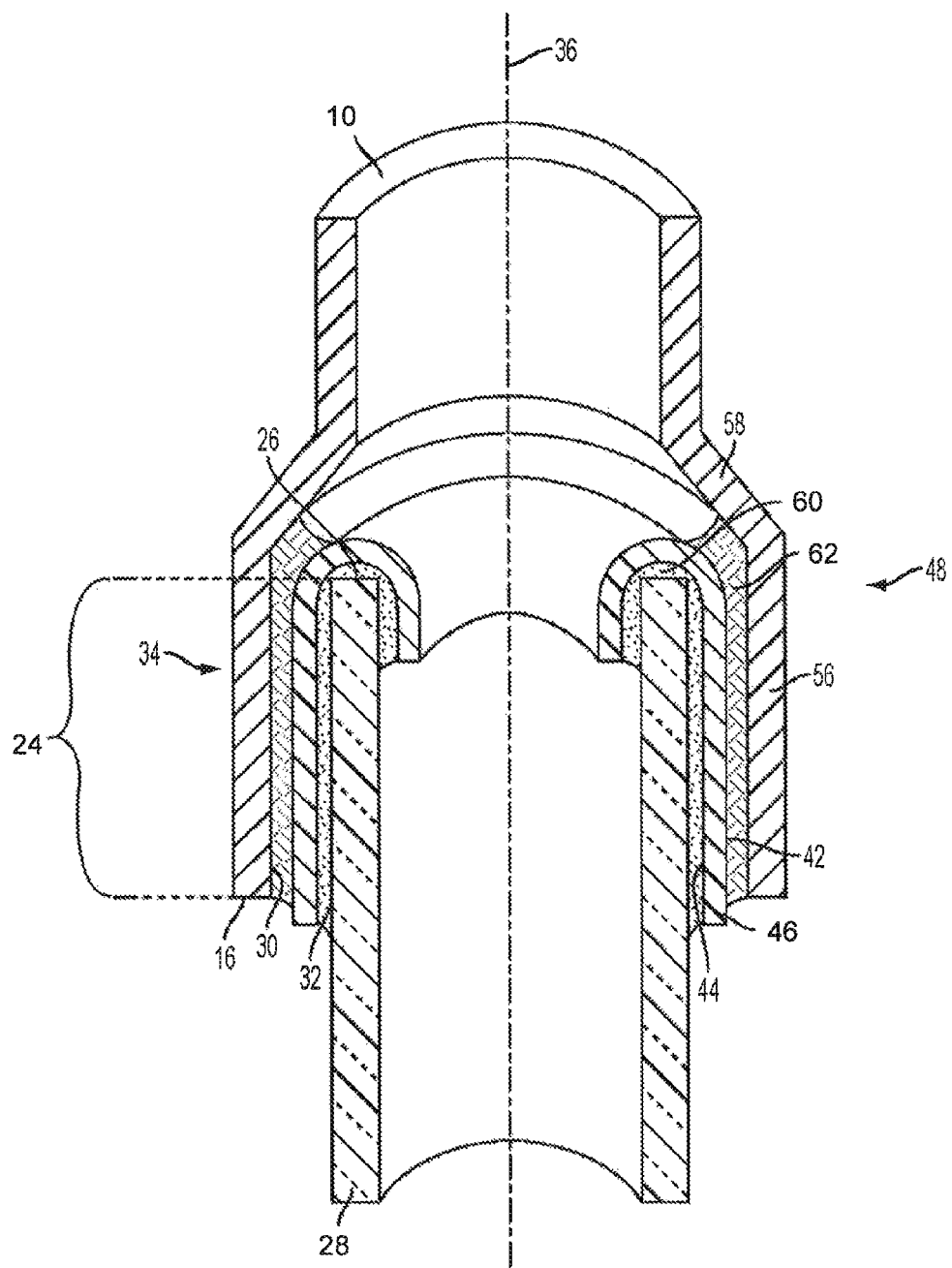
FIG. 6 is a perspective sectional view of one more embodiment of two dissimilar tubes connected together.

In a different embodiment, the physical connection may be just an interference or friction fit, but the interference or friction fit can apply to both the inside and outside surface of the second tube 22, as seen in FIG. 6. In this embodiment, the sleeve 40 is slide over the second tube 22 with some of the sleeve 40 extending beyond the second end 26. The sleeve 40 is then bent over the second end 26, pushed in towards the center of the second tube 22, and pushed further such that the sleeve bends around and presses against the inner surface of the second tube 22. The sleeve 40 can be pressed or crimped on near the second end 26, and that can create a friction fit on both the inner and outer surface of the second tube 22. This fitting can also be reversed such that the sleeve 40 is slide into the inside of the second tube 22 and bent outward to also press against the second tube 22 outer surface. This double friction fit can be combined with a locking abutment 50 for increased strength, as seen in FIG. 1, but in some embodiments the double friction fit is not combined with a locking abutment 50.

The locking abutment 50 as described above helps prevent the sleeve 40 from sliding or moving over the second tube 22 parallel to the tube union central axis 36. In some embodiments, it may be desirable to form a union 34 which also blocks or prevents twisting or rotational movement of the sleeve 40 along the second tube 22. Several different union designs will form a mechanical connection 48 that prevents or resists rotational movement of the sleeve 40 relative to the second tube 22. For example, as seen in FIG. 1, the top of the second end 26 may be crenellated, or have second teeth 27. The sleeve 40 can then be bent over and onto the inner surface of the second tube 22 in the space between the second teeth 27, and the sleeve 40 can simply extend adjacent to the outer surface of the second tube 22 at the second teeth 27. The bent over portions of the sleeve 40 that are positioned between the second teeth 27 will abut the sides of the second teeth 27 to prevent or resist twisting motion between the second tube 22 and the sleeve 30. This sideways abutment that prevents rotational movement can be referred to as a rotational abutment 51, and it includes abutting surfaces similar to the ramp 52 and incline 54, but facing different directions.

Figure 10:
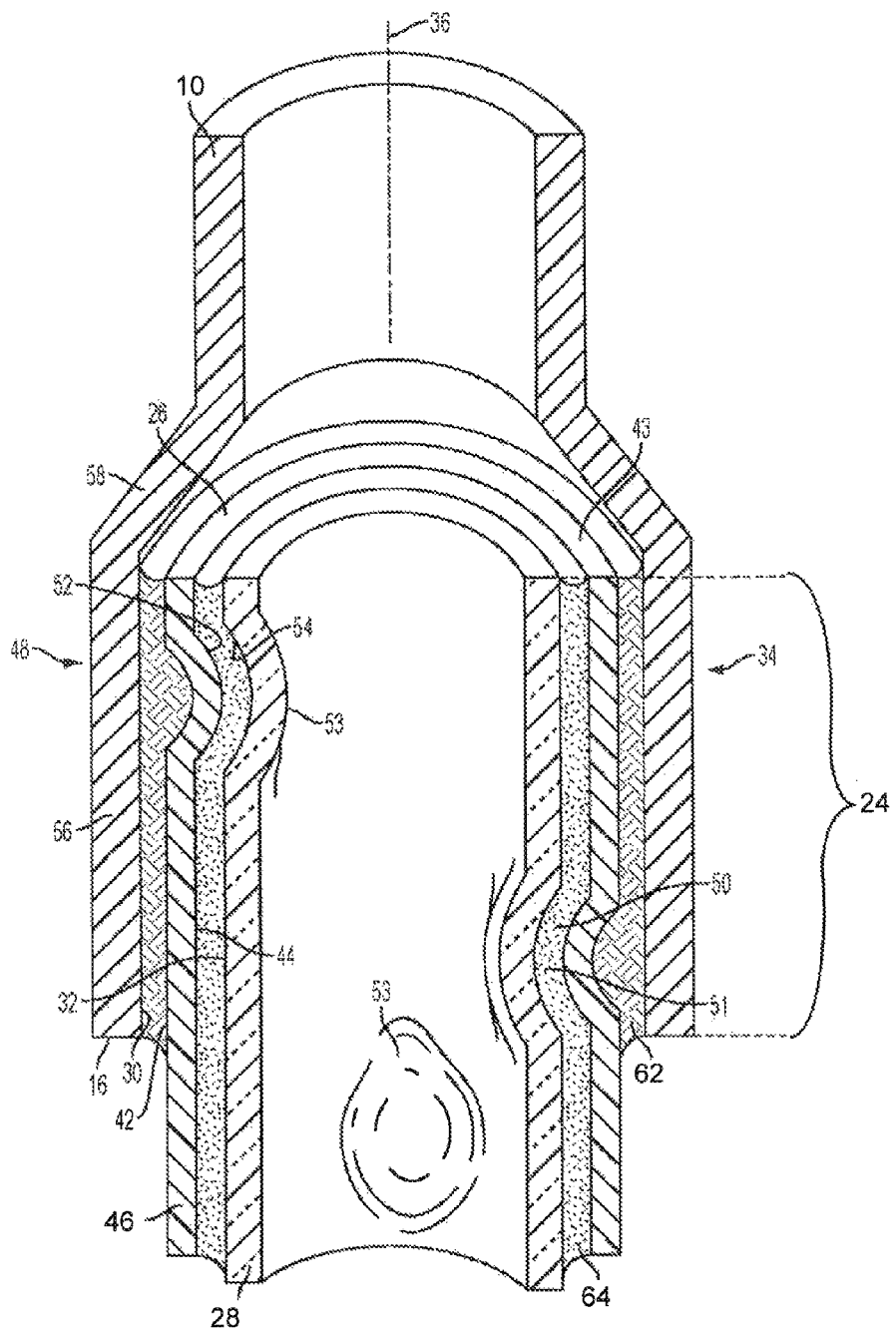
FIG. 10 is a perspective sectional view of an embodiment of two dissimilar tubes connected together, where dimples are formed to mechanically connect the sleeve and second tube.
Figure 11:
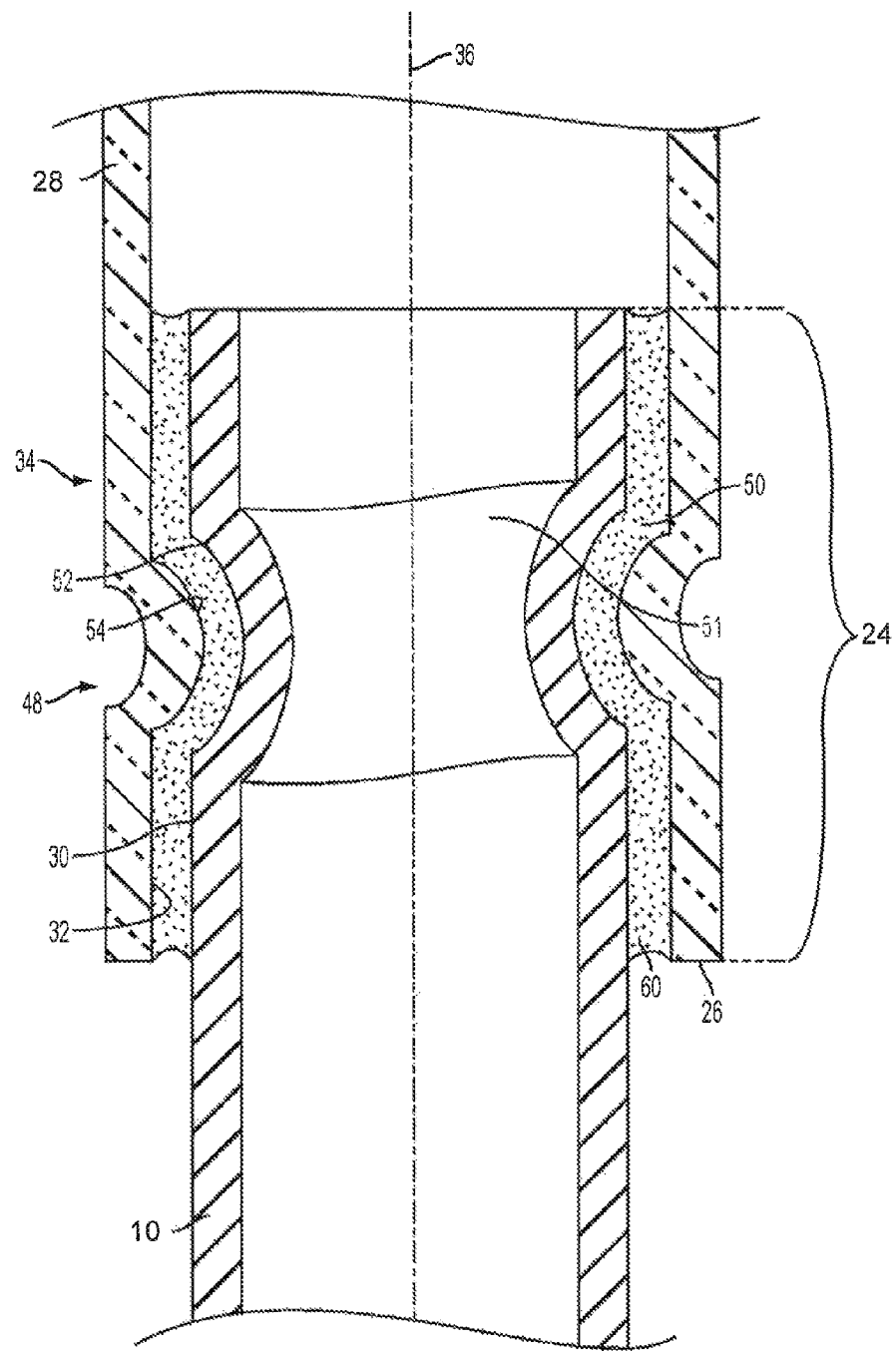
FIG. 11 is a sectional side view of an embodiment where two dissimilar tubes are connected together without a sleeve.

There are several other embodiments that include a rotational abutment 51 to reduce or prevent rotational movement between the first and second tube 12, 22. For example, the second tube 22 and the sleeve 40 could be bent together at interment locations to form dimples 53 to prevent twisting motion, as seen in FIG. 10. The dimples 53 comprise both a locking abutment 50 that prevents slipping parallel to the union central axis 36, and a rotational abutment that prevents rotational slipping that is essentially around the union central axis 36. There could be one or more dimples 53 or other indents, and the dimples 53 could be in almost any pattern or location where the sleeve 40 and the second tube 22 overlap. There are many other embodiments which prevent or resist twisting motion, such as but not limited to the use of pins 76 (as seen in FIG. 2), or intermittent punctures (as seen in FIG. 3), or threads or connectors 72 (as seen in FIG. 9), or even a bent ring where the ring spirals or angles around the union central axis 36 as opposed to circling around one point on the union central axis 36 (as seen in FIG. 11). Each of these embodiments creates a rotational abutment 51 that resists rotational movement, and also creates a locking abutment 50 that resists movement parallel to the union central axis 36.

Figure 12:
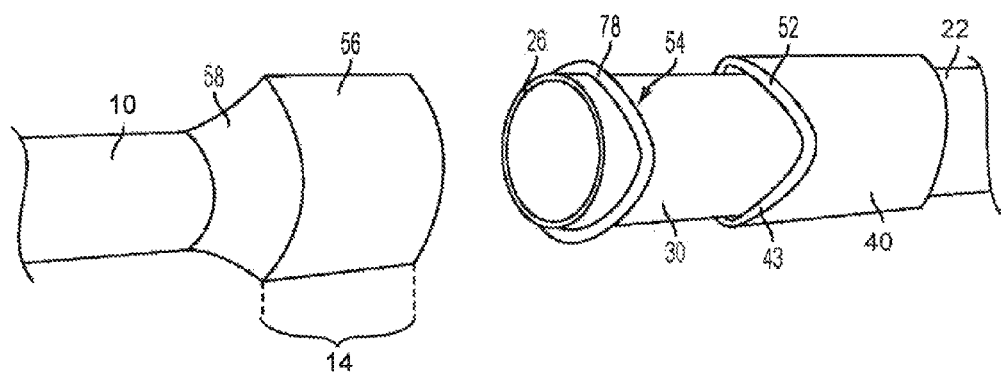
FIG. 12 is an exploded perspective view of an embodiment of two dissimilar tubes connected together, where the end of the sleeve abuts a bead formed on one of the two tubes, but the sleeve is shown separated from the bead for clarity.

FIG. 12 shows another embodiment of the union 34 where the ramp 52 is the sleeve end surface 43, as opposed to the second sleeve surface 44. The sleeve end surface 43 is the short surface along the width of the sleeve 40, or the surface between the first and second sleeve surfaces 42, 44. There are two sleeve end surfaces 43, one on each side, but the sleeve end surface 43 that faces the second end 26 is the sleeve end surface 43 that forms the ramp 52. This embodiment can include a bead 78 that serves as the incline 54, where the bead 78 is a crimped portion of the second tube 22. The bead 78 can be formed with end formers that grab the second tube 22 in clamps with a shape that matches the desired shape of the bead 78, and then crimping the bead 78 with a ram. The ram can have a pilot that enters the inside of the second tube 22, so the crimp cannot bend inwards, and a hit with a shape that also matches the desired shape of the bead 78, so that the ram presses the second end 26 so the second tube 22 bends and crimps to the desired shape of the bead 78. The bead 78 can undulate around the circumference of the second tube 22, and the sleeve 40 can be notched with shearers to have a shape that matches the undulations of the bead 78. The undulations provide a rotational abutment 51, so the mechanical connection 48 displayed in FIG. 12 also serves to prevent relative rotation of the first and second tubes 12, 22.

Connection Substance

A connection substance 60 can be used to make part of the union 34, or to strengthen the physical connection in the union 34. The connection substance 60 is typically a brazing material, solder, or adhesive, and there can be more than one type of connection substance 60 used in a single union 34. Other connection substances 60 are also possible, such as welding material, friction gaskets, or sealing material such as plumbers putty or clay. In some embodiments, the connection substance 60 is in a liquid state when applied, and then the connection substance 60 solidifies, such as with brazing material or solder.

The connection substance 60 may be further classified as the first connection substance 62 that is positioned between the sleeve 40 and the first overlap area 14, and the second connection substance 64 that is positioned between the sleeve 40 and the second overlap area 24. In some embodiments, the first and second connection substance 62, 64 are the same material, and they can be applied at the same time. For example, the sleeve 40 and first and second overlap area 14, 24 can be assembled, and all the spaces can be filled with brazing material or solder at the same time. Capillary action tends to draw the brazing material or solder into the spaces between the sleeve 40 and the first and second overlap areas 14, 24, so one application can fill all the spaces. In this example, the first and second connection substance 62, 64 could be one continuous material or piece without any break or seam.

Alternatively, the first connection substance 62 can be different than the second connection substance 64. One type of brazing material or solder may work well for the connection between the sleeve 40 and the second overlap area 24, and a different type of brazing material or solder may work better for the connection between the sleeve 40 and the first overlap area 14. The two different brazing materials or solder could be applied at different times, so all open spaces would be filled when the different connection substances 60 were applied. Solder melts at a lower temperature, so a brazing material could be applied in a first step, and solder applied in a second step. Alternatively, adhesive could be mixed with brazing material or solder, so the first connection substance 62 could be an adhesive and the second connection substance 64 could be solder, and other types of connection substances 60 could be used individually or combined in a wide variety of possibilities. If the first and second connection substance 62, 64 are applied separately, there may be a break or a seam between them, but it is also possible in some embodiments to melt the first and second connection substances 62, 64 together to eliminate any seam, even if applied at different times.

The second connection substance 64 may be positioned between the ramp 52 and the incline 54 in the locking abutment 50, but the two surfaces are still considered to be abutting. This is also true along essentially any and/or all of the interface between the sleeve 40 and the second overlap surface 32. Similarly, the first connection substance 62 may be positioned between the sleeve first surface 42 and the first overlap surface 30, and the two surfaces are still considered to abut. The tolerances between the overlap areas 14, 24 and the sleeve 40 are small, so it is appropriate to consider them as abutting.

The sleeve 40 can extend beyond the union 34, so the first and/or second connection substance 62, 64 may be present between the sleeve 40 and the first or second tube 12, 22 outside of the union 34. This can increase the surface area for connecting the sleeve 40, if desired.

An alternative embodiment can include a union 34 between a first and second tube 12, 22 where there is a mechanical connection 48 with a locking abutment 50 and a connection substance 60, but there is no sleeve 40 between the first and second tube 12, 22. One embodiment of this design is shown in FIG. 11, but many of the variations discussed for a union 34 with a sleeve 40 also apply to the design without a sleeve 40. FIG. 11 shows an indent that makes the locking abutment 50, and this indent is not circular around the union central axis 36 because the indent at the point crossing the line indicating the union central axis 36 is lower than the indent at the cross section shown with hash marks. This non-circular aspect of the indent serves to prevent rotation about the union central axis 36, so this indent also serves as a rotational abutment 51. In this design, the connection substance 60 is directly between the first and second tube 12, 22, and the mechanical connection 48 and locking abutment 50 are also between the first and second tube 12, 22. In particular, the ramp 52 would be at least part of the first overlap surface 30, and the incline 54 would be at least part of the second overlap surface 32. This embodiment is particularly applicable to metallic tubular components, but can also be used for non-metallic components and other shapes. The union 34 is this design may not be as strong as the union 34 with a sleeve 40, but this union 34 may be less expensive to produce and the combination of a mechanical connection 48 with a connection substance 60 may provide adequate strength and longevity.

Sacrificial Anode

With reference now to FIG. 1, the second material 28 can be more noble than the first material 18 (or vice versa). The third material 46 of the sleeve 40 can be selected to match, or at least be compatible with, the less noble first material 18. The connection substance 60 tends to make a stronger connection between compatible materials than between very different materials, so the connection substance 60 tends to make a stronger connection between the sleeve 40 and the first tube 12. The connection substance 60 tends to make a weaker connection between the sleeve 40 and the second tube 22, and this connection is more susceptible to galvanic corrosion. However, there is a mechanical connection 48 between the sleeve 40 and the second tube 22, and this mechanical connection 48 serves as reinforcement or a back-up for the bond between the sleeve 40, the second connection substance 64, and the second tube 22. In a union 34 without a mechanical connection 48, galvanic corrosion can cause failure of the bond at the second tube 22, so this mechanical connection 48 should extend the life of the union 34 by providing a back-up to that bond.

A sacrificial anode 70 can be placed at the union 34 to help control galvanic corrosion within the union 34. For example, if the first and second tubes 12, 22 are used for air conditioning, refrigerant may be flowing through the tube interior. The interior of the closed air conditioner tubing system is typically kept free of moisture or water, and the refrigerant is also typically kept very free of water. The refrigerant typically does not serve as an electrolyte. However, there is usually considerable exposure to water condensation on the outside of air conditioning tubing, either from the cooling effect of hot moist air in evaporator assemblies or from exposure to the elements from outdoor units, such as condenser units. This condensate will act as an electrolyte. The use of a sacrificial anode 70 can help minimize galvanic corrosion when different types of metal are used for the tubing. Aluminum may be used in an air conditioning unit to reduce weight and cost over copper, but copper may be used outside of the air conditioning unit because copper to copper connections are relatively easy to make by installation personnel at a job site.

When the sacrificial anode 70 is gone, or if no sacrificial anode 70 is used, galvanic corrosion may be expected between the second tube 22 and the connection substance 60. This is true if the second material 28 is more noble than the first material 18, or vice versa. This galvanic corrosion can weaken the union 34 as a whole, but there is a physical connection between the second tube 22 and the sleeve 40 that serves to "back up" the connection made by the connection substance 60.

Galvanic corrosion can be particularly significant at two different locations: (i) at the interface between the sleeve 40 and the second tube 22, and (ii) at the interface between the second tube 22 and the second connection substance 64. The sleeve 40 and the first tube 12 are similar materials, so there should not be significant galvanic corrosion problems between these two components. The first connection substance 62 may also be made of a similar material to the first material 18 to help make a stronger connection. Additionally, the first and second connection substance 62, 64 may be the same material, and the second material 28 is different than the first material 18, so there may be galvanic corrosion issues between the second material 28 and the connection substance 60.

The sacrificial anode 70 should simultaneously contact the second tube 22 and at least one of (i) the first tube 12, (ii) the sleeve 40, (iii) the first connection substance 62, and (iv) the second connection substance 64, because any of these components may contact the second tube 22 at various locations in the union 34. In some embodiments, the sacrificial anode 70 will contact each of the first and second tube 12, 22, the first and second connection substance, 62, 64, and the sleeve 40. The sacrificial anode 70 should be positioned in a location prone to exposure to an electrolyte, such as a low point that water will flow towards.

The sacrificial anode 70 should have a lower electrode potential than any of the first material 18, the second material 28, the third material 46 of the sleeve 40, or the connection substance 60. The electrode potential of the sacrificial anode 70 should be at least 0.05 volts lower than any metal it is contacting, or more preferably at least 0.2 volts lower, and most preferable at least 0.4 volts lower. Therefore, the sacrificial anode 70 should be the least noble metal potentially exposed to an electrolyte. For example, consider if the first and third materials 18, 46 are aluminum and the second material 28 is copper. In many embodiments, the first and third materials 18, 46 are similar, which can increase the bond strength between the first tube 12 and the sleeve 40. The electrode potential depends on the number of electrons transferred, but in one embodiment pure copper has an electrode potential of +0.34 volts, and pure aluminum has an electrode potential of −1.66 volts. (Electrode potentials taken from a standard hydrogen electrode, values from the CRC Handbook of Chemistry and Physics, 67$^{th}$ Edition, 1987, pp. D151-D-155). Magnesium could be used as the sacrificial anode 70, because magnesium has an electrode potential of −2.37 volts, for a difference of 0.71 volts. Many alloys of aluminum have a higher standard electrode potential than pure aluminum, so the alloys are more noble. For many of these aluminum alloys, zinc or certain alloys of zinc can be used as a sacrificial anode 70.

The sacrificial anode 70 should be placed in connection with an exposed interface of the second material 28 and the sleeve 40 and/or the connection substance 60. The sacrificial anode 70 can be a wire or other pliable material that is wrapped around that interface, or it can be applied as a liquid and allowed to solidify. It can be small pieces that are secured to that interface, so that ridged pieces can be connected at various locations. The sacrificial anode 70 can be soldered or brazed, welded, adhered with an adhesive, connected with a physical connection, or connected with other methods, as desired. There can also be other protection measures, such as a shrink fit cover, paint, lacquer, or other measures to prevent water from sitting at the interface, and/or to secure the sacrificial anode 70 in place.

The sacrificial anode 70 can be placed in many ways. The sacrificial anode 70 can be continuous, so the enter interface of the second tube 22 and the sleeve 40, first and/or second connection substance 62, 64 is contacted. The sacrificial anode 70 can be on one or both of the inner or outer surfaces of the tubing, as necessary and desirable.

When the sacrificial anode 70 has been used up, the first tube 12 will act as the sacrificial anode to in embodiments where the second material 28 is more noble than either the first material 18, the third material 46 of the sleeve 40, or the connection substance 60. In fact, the addition of the sleeve 40 and connection substance 60 can provide additional sacrificial material at the union 34 to increase the lifespan of the union 34 as a whole, either after the sacrificial anode 70 has corroded away or in embodiments with no sacrificial anode 70. In many embodiments, the first material 18, the third material 46 of the sleeve 40, and the connection substance 60 are similar materials, and the second material 28 is a different, more noble material. For comparison, consider a union 34 without the sleeve 40 where there is only one layer of connection substance 60 and the first tube 12 that will galvanically corrode away preferentially to the more noble second tube 22. The union 34 in this description adds a sleeve 40 and a second layer of connection substance 60 to increase the amount of material available to galvanically corrode away, thus increasing the lifespan of the union 34.

Embodiments and Methods

Figure 7:
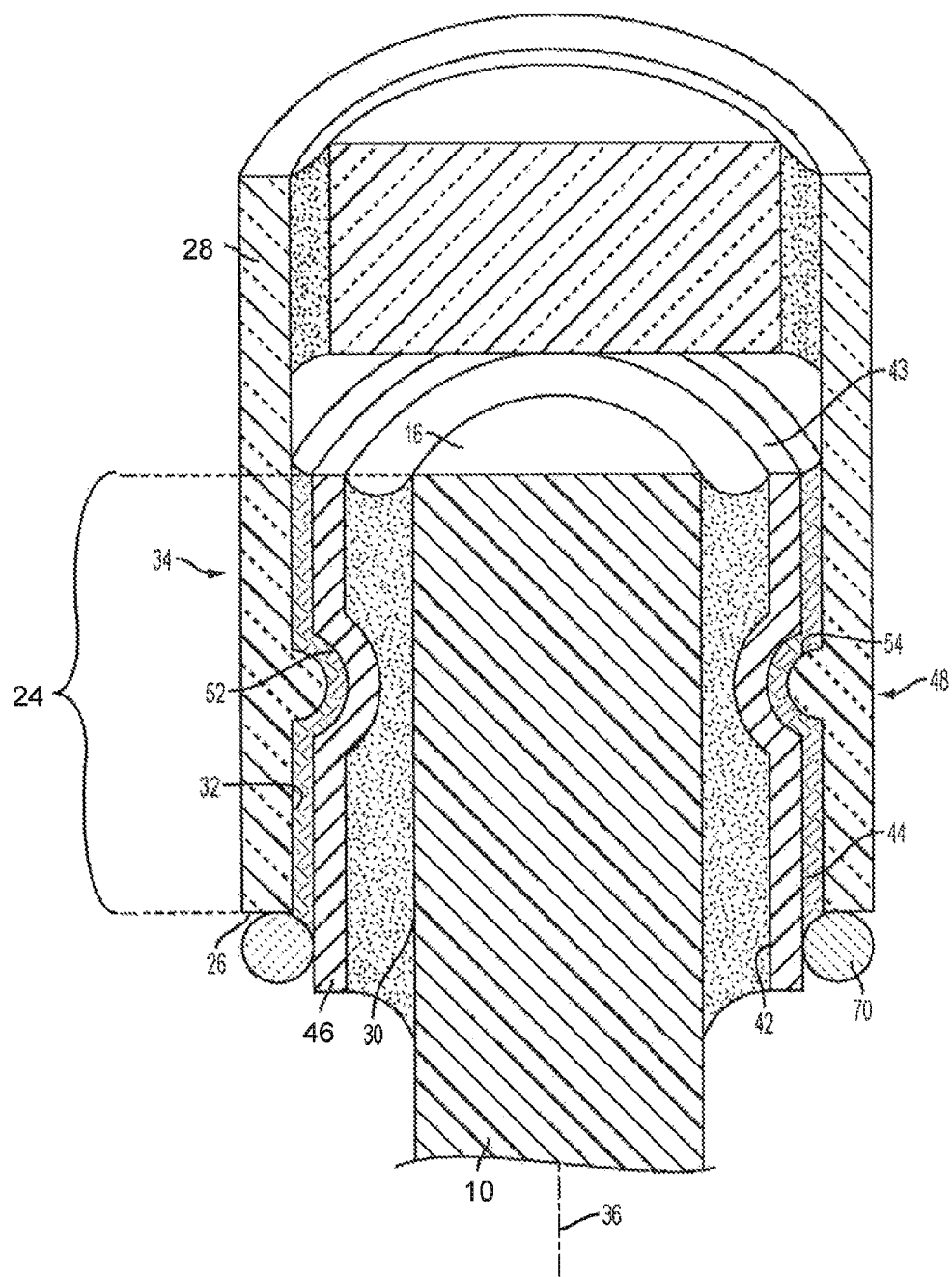
FIG. 7 is a perspective sectional view of an embodiment of two dissimilar rods connected together with a connecting tube.

This description has focused on tubes, but many different types of objects can be connected using the same concepts. For example, two different blocks could be connected, as shown in FIG. 2. Two different cylinders or wires could be connected with a connection tube, as shown in FIG. 7. In a slight variation, one of the cylinders could have an expanded end 56 sized and shaped to connect with the other. If two wires were connected this way, a conductive gel or other compound could be placed in the space between the wires. Two different thin sheets could be connected in a similar manner as the blocks shown in FIG. 2.

In one embodiment, the first and second body 10, 20 and the sleeve 40 are provided. The sleeve 40 is placed on the second body 20, and a mechanical connection 48 is made. The sleeve 40 and second body 20 are overlapped with the first body 10 after the mechanical connection 48 is made. Connection substance 60 is added after the mechanical connection 48, and it can be added in one step after the overlapped area with the first body 10 is made. Alternatively, a second connection substance 64 can be added as a liquid after the mechanical connection 48 is made, but before the overlap with the first body 10 is made. The second connection substance 64 can be allowed to solidify, and then the overlap with the first body 10 can be made. After the overlap with the first body 10 is made, the first connection substance 62 can be added.

Alternate methods of production are also possible. The sleeve 40 embodiment with a ramp 52 shown in FIG. 5 can be assembled in full, and then secured in place with the connection substance 60. The mechanical connection 48 is made with the assembly of the different components, and this mechanical connection 48 is secured in place by the connection substance 60. This embodiment can also be performed in steps with separate addition of first and second connection substances 62, 64, if desired.

In yet another embodiment, the union 34 can be assembled with the first and second body 10, 20 and the sleeve, and a mechanical connection 48 of all three components can made. This embodiment is shown in FIG. 8. Connection substance 60 can be added before or after the mechanical connection 48 is made by deformation, and the first and second connection substance 62, 64 can be added all at once or separately, as desired.

A sacrificial anode 70 can be added to the union 34 on any of the above methods. The sacrificial anode 70 can be a wire that is wrapped around the union in contact with the desired interface, or it can be beads, bars, or molten material that is placed at the proper interface. The sacrificial anode 70 can be secured in place by tightly wrapping it, allowing it to solidify, adding adhesive, securing it in place with shrink wrap, or any other desired connection technique. The sacrificial anode 70 is typically added after the rest of the union 34 is made, but precise placement could allow for pre-positioning the sacrificial anode 70 at the proper location. An additional protective coating can also be added after the union 34 is formed. This can be painted on, sprayed on, melted and poured on, shrink wrapped on, or added in other ways.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

The invention claimed is:

1. An article comprising:
   (a) a first body comprising a first material, where the first body has a first body overlap area terminating in a first end, wherein the first body overlap area is formed on an inner periphery of the first end;
   (b) a second body comprising a second material different than the first material, where the second body has a second body overlap area terminating in a second end, wherein the second body overlap area is formed on an outer periphery of the second end and is sized to fit within the first body overlap area, the second body further comprising an axially undulating bead formed on the second body overlap area;
   (c) a sleeve comprising a third material, where the sleeve has a first surface facing the first overlap area and a second surface facing the second overlap area, and where the third material is at least similar to the first material, the sleeve further comprising a notched sleeve end surface, the notched sleeve end surface shaped and configured to axially mate with and abut against the undulating bead;
   (d) a first connection substance positioned radially between the sleeve and the first body overlap area;
   (e) a second connection substance positioned radially between the sleeve and the second body overlap area; and
   (f) a locking abutment formed by the undulating bead in abutment with the undulating sleeve end surface, the locking abutment preventing relative rotating of the first and second bodies.

2. The article of claim 1 where the third material is the same as the first material.

3. The article of claim 1 where the third material and the first material are different alloys comprising the same metallic element at a concentration of at least 70%.

4. The article of claim 1 where the first material primarily comprises aluminum, and the second material primarily comprises copper.

5. The article of claim 1 further comprising a sacrificial anode simultaneously contacting the second body and at least one of the first body, the first connection substance, the second connection substance, and the sleeve, and where the sacrificial anode is less noble than the first material, the second material, and the third material.

6. The article of claim 1 where the first body has a rectangular cross section.

7. The article of claim 1 where the first body comprises a cylinder.

8. The article of claim 1 where the first, second and third materials are metallic, and the first and second connection substances are selected from the group consisting of a brazing material and a solder.

9. An article comprising:
   (a) a first tube comprising a first material, where the first tube has a first tube overlap area terminating in a first end, wherein the first tube overlap area is formed on an inner periphery of the first end;
   (b) a second tube comprising a second material different than the first material, where the second tube has a second tube overlap area terminating in a second end, wherein the second tube overlap area is formed on an outer periphery of the second end and is sized to fit within the first tube overlap area, the second tube further comprising an axially undulating bead formed on the second tube overlap area;
   (c) a sleeve comprising a third material, where the sleeve is positioned radially between the first tube overlap area and the second tube overlap area, the sleeve further comprising a sleeve first surface facing the first tube overlap area and a sleeve second surface facing the second tube overlap area, the sleeve further comprising a notched sleeve end surface, the notched sleeve end surface shaped and configured to axially mate with and abut against the undulating bead;
   (d) a first connection substance positioned radially between the first tube overlap area and the sleeve;
   (e) a second connection substance positioned radially between the second tube overlap area and the sleeve; and
   (f) a locking abutment formed by the undulating bead in abutment with the undulating sleeve end surface, the locking abutment preventing relative rotating of the first and second tubes.

10. The article of claim 9 where the first and second connection substances are the same material.

11. The article of claim 10 where the first and second connection substances are continuous, without a break or seam between the first and second connection substances.

12. The article of claim 9 where the third material is the same as the first material.

13. The article of claim 9 where the first material comprises primarily aluminum and the second material comprises primarily copper.

14. The article of claim 9 where the sleeve has an essentially constant thickness.

15. The article of claim 9 further comprising a sacrificial anode in simultaneous contact with the second tube and at least one of the first tube, the first connection substance, the second connection substance, and the sleeve, where the first and second tube are metallic and where the sacrificial anode is less noble than the first material, the second material, and the third material.

16. The article of claim 9 where the first, second, and third materials are metallic, and the first and second connection substances are selected from the group consisting of brazing material or solder.

* * * * *